United States Patent
Hegde et al.

(10) Patent No.: US 11,087,055 B2
(45) Date of Patent: Aug. 10, 2021

(54) METHOD OF SCREENING MATERIALS USING FORWARD CONDUCTING MODES

(71) Applicant: Samsung Electronics Co., Ltd., Gyeonggi-do (KR)

(72) Inventors: Ganesh Hegde, Austin, TX (US); Harsono S. Simka, Saratoga, CA (US); Chris Bowen, Austin, TX (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 81 days.

(21) Appl. No.: 15/985,543

(22) Filed: May 21, 2018

(65) Prior Publication Data
US 2019/0155977 A1    May 23, 2019

Related U.S. Application Data

(60) Provisional application No. 62/587,826, filed on Nov. 17, 2017.

(51) Int. Cl.
*G06F 30/30* (2020.01)
*H01L 23/532* (2006.01)
*H01L 23/528* (2006.01)
*G06F 30/367* (2020.01)
*G06F 111/10* (2020.01)

(52) U.S. Cl.
CPC ............ *G06F 30/30* (2020.01); *G06F 30/367* (2020.01); *H01L 23/528* (2013.01); *H01L 23/53204* (2013.01); *G06F 2111/10* (2020.01)

(58) Field of Classification Search
CPC ................ H01L 23/528; H01L 23/532; H01L 23/53204; G06F 30/30; G06F 30/367
See application file for complete search history.

(56) References Cited

U.S. PATENT DOCUMENTS

| | | |
|---|---|---|
| 6,670,539 B2 | 12/2003 | Heremans |
| 6,858,154 B2 | 2/2005 | Suzuki |
| 7,767,564 B2 | 8/2010 | Dutta |
| 7,910,064 B2 | 3/2011 | Hamilton |
| 8,044,293 B2 | 10/2011 | Yang |
| 8,101,449 B2 | 1/2012 | Liang |
| 9,574,272 B2 | 2/2017 | Markovich |
| 2006/0032526 A1 | 2/2006 | Fukutani |
| 2011/0165709 A1* | 7/2011 | Dutta ................ H01L 29/78696 438/28 |

(Continued)

OTHER PUBLICATIONS

Alton I. Hochbaum; et al., "Enhanced thermoelectric performance of rough silicon nanowires," Jan. 10, 2008; Nature 451, 163-167, doi:10.1038/nature06381 (Located via Google Scholar).

(Continued)

*Primary Examiner* — Matthew E Warren
(74) *Attorney, Agent, or Firm* — Van Pelt, Yi & James LLP (57) ABSTRACT

A method for characterizing a material for use in a semiconductor device and the semiconductor device using the material are described. The material has a unit cell and a crystal structure. The method includes determining a figure of merit (FOM) for the material using only forward conducting modes for the unit cell. The FOM is a resistivity multiplied by a mean free path. The FOM may be used to determine a suitability of the material for use in the semiconductor device.

14 Claims, 5 Drawing Sheets

(56) References Cited

U.S. PATENT DOCUMENTS

2013/0240837 A1* 9/2013 Bandyopadhyay ............................ H01L 21/02603
257/21
2014/0054612 A1* 2/2014 Domeij ............. H01L 29/66068
2018/0097167 A1* 4/2018 Nishide ................... C22C 38/12

OTHER PUBLICATIONS

Hegde et al., "A tight binding model suitable for transport in bulk metals, metal nanowires, alloys and heterostructures I," J.Appl. Phys. 2014.

Hegde et al., "A tight binding model suitable for transport in bulk metals, metal nanowires, alloys and heterostructures II," J.Appl. Phys. 2014.

Hedge, et al, "Lower limits of line resistance in nanocrystalline back end of line Cu interconnects," Appl. Phys. Lett. 109, 193106 (2016): https://doi.org/10.1063/1.4967196.

Daniel Gall, "Electron mean free path in elemental metals," Journal of Applied Physics 119, 085101 (2016); doi: 10.1063/1.4942216 (http://dx.doi.org/10.1063/1.4942216.

* cited by examiner

METHOD OF SCREENING MATERIALS USING FORWARD CONDUCTING MODES

CROSS-REFERENCE TO RELATED APPLICATIONS

This application claims the benefit of provisional Patent Application Ser. No. 62/587,826, filed Nov. 17, 2017, entitled "SCREENING LOW RESISTANCE MATERIALS USING FORWARD CONDUCTING MODES", assigned to the assignee of the present application, and incorporated herein by reference.

BACKGROUND

Back End of Line (BEOL) interconnects connect logic devices to each other and to power and clock signals in semiconducting devices. The conductive portion of BEOL interconnects are nominally composed of highly conductive metals. For example, conventional interconnects may use materials such as Cu, Al, W, which have a low bulk resistivity. High conductivity/low resistivity materials are utilized to meet the desired performance targets for the interconnect.

The trend in semiconductor technologies is to scale to smaller sizes. Both the pitch and the width of the interconnect are scaled down. Although metals have a low bulk resistivity, the resistivity of metals increases with scaling down to small dimensions. This is known as the size effect on the resistivity of a metal. At sufficiently small dimensions, the resistivity of the interconnect material increases above that of the bulk resistivity. Materials such as Cu may be subject to significant increases in resistance with pitch scaling. For example, a ten nanometer wide copper interconnect may have a resistivity that is an order of magnitude greater than the bulk resistivity. Consequently, copper interconnects may not continue to be scaled at future nodes without exceeding performance targets. Although Co and Ru have been studied for use at lower nodes, other materials are still desired to be investigated for use in interconnects.

Recently, it has been shown that the product of resistivity ($\rho$) and the mean free path ($\lambda$) can be used as a Figure of Merit (FOM) for resistivity scaling. The lower the figure of merit, the better the material performs upon scaling to smaller sizes. A conventional method for determining the FOM of a material relies upon a semiclassical description of the resistivity of bulk metals. The method involves determining the energy-momentum/band structure relation for a dense grid of momentum points and the computation of the Fermi Surface of the solid from the band structure. With some simplifying assumptions, the method involves the calculation:

$$\frac{1}{\lambda \rho_0} = \frac{e^2}{4\pi^3 \hbar} \sum_n \int \int_{S_F^n} \frac{v_{t,n}^2(k)}{v_n^2(k)} dS$$

Where, $\lambda$ is the mean free path, $\rho_0$ is the bulk resistivity, e is the electron charge, $\hbar$ is the reduced Planck's constant, v is the velocity as a function of wave vector k, n is the index of the band, dS is the differential surface area and $S_F^n$ is the Fermi surface. For larger unit cells, the method is, therefore, computationally very cumbersome and may be unsuited for machine learning or data mining in large datasets. In addition, the method finds the FOM in bulk metals and assumes that the FOM is extensible to thin films and nanowires. However, as discussed above, conductance degrades with confinement. Consequently, the method may not provide usable results for narrow pitches. Accordingly, an improved mechanism for determining appropriate materials to be used in future scaled nodes is desired.

BRIEF SUMMARY OF THE INVENTION

A method for characterizing a material for use in a semiconductor device and the semiconductor device using the material are described. The material has a unit cell and a crystal structure. The method includes determining a figure of merit (FOM) for the material using only forward conducting modes (e.g. bands crossing the Fermi surface/moving in the direction of the canonical transport orientation described below) for the unit cell. The FOM is a resistivity multiplied by a mean free path. The FOM may be used to determine a suitability of the material for use in the semiconductor device.

The method described herein may be used to compute the FOM for bulk materials and/or nanowires using only forward conducting modes. The FOM can be used to screen materials for use as interconnects in scaled down nodes. Further, the method for providing the FOM is simpler than and may have improved runtime efficiency over conventional methods. Upon calculation of the FOM for multiple materials, the structures and resulting FOMs may be used in conjunction with machine learning to extract a model that captures the relationship between the FOMs and the atomic structures. The model may then be used for significantly faster prediction of the FOM for other materials. Thus, the method may be conceptually and practically simpler, more efficient and more easily integrated with state-of-the-art machine learning algorithms.

DETAILED DESCRIPTION OF THE INVENTION

The exemplary embodiments relate to selection of materials for electronic devices, particularly for interconnects used in semiconductor devices. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations.

Phrases such as "exemplary embodiment", "one embodiment" and "another embodiment" may refer to the same or different embodiments as well as to multiple embodiments. The exemplary embodiments will be described in the context of particular methods having certain steps. However, the method and system operate effectively for other methods having different and/or additional steps and steps in different orders that are not inconsistent with the exemplary embodiments. The embodiments also will be described with respect to systems and/or devices having certain components. However, the systems and/or devices may include more or fewer components than those shown, and variations in the arrangement and type of the components may be made without departing from the scope of the invention. Thus, the present invention is not intended to be limited to the embodiments shown, but is to be accorded the widest scope consistent with the principles and features described herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

A method for characterizing a material for use in a semiconductor device and the semiconductor device using the material are described. The material has a unit cell and a crystal structure. The method includes determining a figure of merit (FOM) for the material using only forward conducting modes for the unit cell. The FOM is a resistivity multiplied by a mean free path. The FOM may be used to determine a suitability of the material for use in the semiconductor device.

Figure 1:
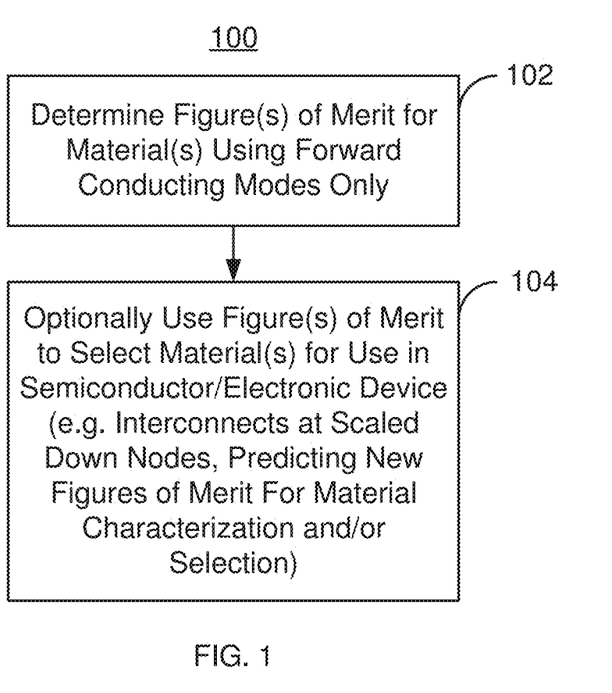
FIG. 1 is a flow chart depicting an exemplary embodiment of a method for providing characterizing a material for use in electronic devices.

FIG. 1 is a flow chart depicting an exemplary embodiment of a method 100 for characterizing a material for use in electronic devices. For simplicity, some steps may be omitted, performed in another order and/or combined. The method 100 may be used for bulk calculations or nanowires, in which the material is confined in directions perpendicular to the direction of conduction. Thus, the method 100 may be used to screen the material for use in interconnects or other structures. The material has a crystal structure that may be represented by a unit cell that includes the type and position of atoms.

A figure of merit (FOM) for the material is determined using only forward conducting modes for the unit cell, via step 102. The FOM is a resistivity multiplied by a mean free path for the material. As discussed above, the resistivity increases with decreases in dimension. The mean free path may also differ from that found in bulk materials. Thus, the FOM determined in step 102 may differ from the bulk resistivity multiplied by the bulk mean free path, particularly for nanowires. Step 102 may be performed using boundary conditions for bulk or for nanowires. Consequently, the FOM appropriate for the use may be calculated. Step 102 includes determining the electronic structures for the canonical transport orientations for the unit cell, determining the Fermi level for each of the electronics structures, and determining the number of bands crossing the Fermi level for each of the electronic structures. The canonical transport orientations correspond to the directions of forward motion for a given nanowire. Each nanowire has a different cross-sectional area (i.e. number of unit cells in directions transverse to the canonical transport direction is different for different nanowires). The number of bands crossing the Fermi level is the number of forward conducting modes. It has previously been shown that the number of bands versus the cross-sectional area is linear for lower nanowire cross-sectional areas. See, for example, "An environment-dependent semi-empirical tight binding model suitable for transport in bulk metals, metal alloys, metallic interfaces and metallic nanostructures I and II", Hegde et al. J.Appl.Phys. 2014". The slope of the number of bands versus cross-sectional area, k, can be used to calculate a canonical transport orientation FOM for each canonical transport orientation of each by:

$$\frac{1}{\lambda \rho} = \frac{2e^2}{4\pi^3 \hbar} k$$

where $\lambda \rho$ is the FOM for the canonical transport orientation. Again, note that $\lambda \rho$ may differ from $\lambda \rho_0$. A statistical average of the FOMs for the canonical transport orientations of the unit cell may then be determined. This statistical average can be considered to be the FOM for the material. Step 102 may be repeated for multiple materials.

The FOM may then optionally be used to determine a suitability of the material for use in the semiconductor device, via step 104. Either the FOMs for specific orientations or the FOM for the material may be used in the determination, depending upon the application. Accurate FOMs may be determined for nanowires and used to determine materials for use in applications in scaled down nodes. For example, the method 100 indicates that Rh, Ir or Ni may be selected in step 104 for use in interconnects for smaller scale nodes. For FOMs determined in step 102 using bulk boundary conditions, the FOMs of different materials may be used to predict differences in the conductivities of bulk materials. Although the FOMs may not be numerically exact for bulk, the trends are accurate and may be used to select between materials for bulk applications. However, the FOM determined in step 102 for a bulk material should not be compared against an FOM determined in step 102 for another material in the nanowire/interconnect regime. Stated differently, comparisons between FOMs in step 104 should be between materials or orientations with the similar boundary conditions (e.g. both nanowire or both bulk).

In addition to selecting materials directly based on the FOMs, step 104 may also include integrating the FOMs with machine learning to predict FOMs for other materials. These predictions also can be used in selecting the materials for use in a semiconductor device. For example, a data base of the FOMs (for bulk and/or nanowire) as well as the atomic structures of the materials for which the FOMs were determined may be created. The features for machine learning may include descriptors of crystal structure, valence electron configuration, a bispectrum or radial distribution function derived from the positions of atoms in the unit cell and their translations and/or other structural characteristics. A machine learning algorithm may then be applied to map the structure to the FOM. Once this is accomplished, a user may simply input the structural characteristics of new material(s) and obtain a predicted FOM for the new material(s). The predicted FOM may be compared to other predicted and/or calculated FOMs to determine suitability of materials for use in semiconductor devices.

The method 100 provides a number of benefits. The method provides accurate FOMs for nanowires, thin films and bulk materials within a single unified framework. For bulk materials, trends in the FOMs of different materials may be used to predict differences in the conductivities of materials. For long nanowires, the FOM may be exact. This is an advantage over conventional methods which calculate FOMs for bulk and then extend the results to nanowires. As discussed above, because of the size effect, extending bulk results to nanowires/interconnects having cross-sectional sizes in the nanometer or tens of nanometer range may not provide accurate FOMs. Further, nanowires typically have a transport orientation. In general, materials are not truly isotropic. Thus, confinement in the transverse orientations (perpendicular to the transport direction) may result in different FOMs for different transport orientations of the same material. Because the method determines the FOMs based on the canonical transport orientations, the FOMs for the desired orientations may be determined. The method 100 is also relatively simple. Instead of interpolating over a Fermi surface using a large grid of points, the method 100 uses forward conducting modes for each canonical transport orientation and counts bands. This is computationally easier. Further, the determination of the FOM from the number of forward conducting modes involves linear interpolation, which is relatively simple. Because of the relative simplicity of the calculation, the method 100 may provide improved runtime efficiency. The method may also be relatively simply extended to use with machine learning to improve prediction of results for additional materials.

Figure 2:
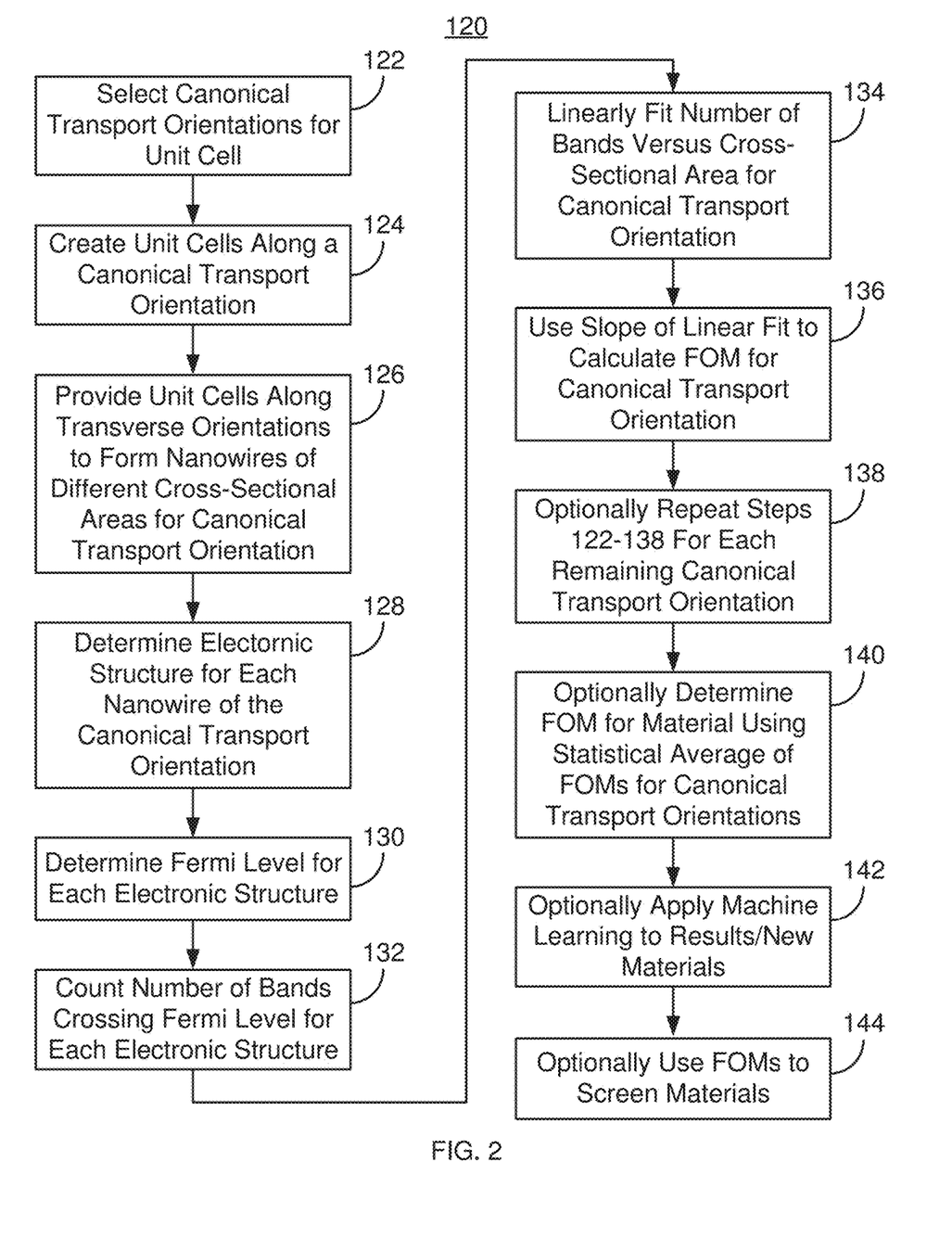
FIG. 2 is a flow chart depicting another exemplary embodiment of a method for determining a figure of merit for a material for use in electronic devices.

FIG. 2 is a flow chart depicting an exemplary embodiment of a method 120 for determining an FOM of a material usable in electronic devices. For simplicity, some steps may be omitted, performed in another order and/or combined. The material has a crystal structure that may be represented by a unit cell that includes the type and position of atoms. For example, the unit cell may be for face-centered cubic (FCC), hexagonal close-packed (HCP) or other crystal structures. The unit cell may be determined from information about the material available in any one of a number of known databases or analogous sources. Such sources may also be used to select the material for which the FOM is desired to be calculated.

Figure 3:
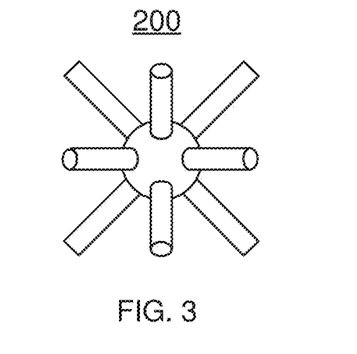
FIGS. 3-5 are exemplary embodiments of representations of a material characterized using a method described herein.

The canonical transport orientations (directions) for the unit cell are determined and one of the canonical orientations selected, via step 122. For example, FCC metals such as Cu, Au, Ag, Al, Ni, Rh and Ir have canonical transport orientations of [100], [110], [111], [112]. HCP materials such as Ru, Co have canonical transport orientations [00-11] and [11-20]. For composite materials of the type $A_xB_y$, the canonical transport orientations selected may be [100], [010], [001], [110] and [111]. Other orientations are possible, particularly for other materials. FIG. 3 depicts is an exemplary embodiment of a unit cell for a material with an FCC crystal structure.

Figure 4:
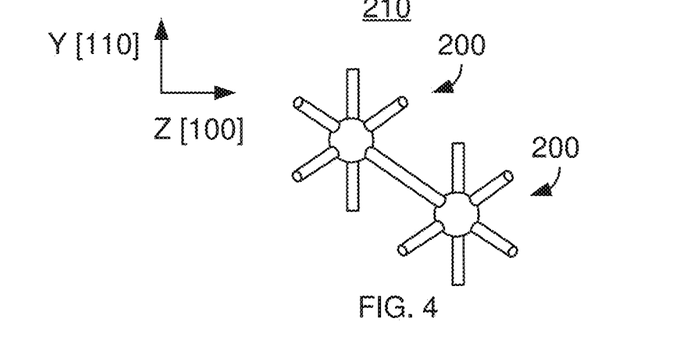

A plurality of unit cells are created along the canonical transport orientation that was selected, via step 124. FIG. 4 depicts the plurality 210 of the unit cells 200 that have been connected along the canonical transport orientation (the [100]-z direction in the embodiment shown). Although only two cells 200 are shown, typically a significantly larger number of cells are repeated.

Figure 5:
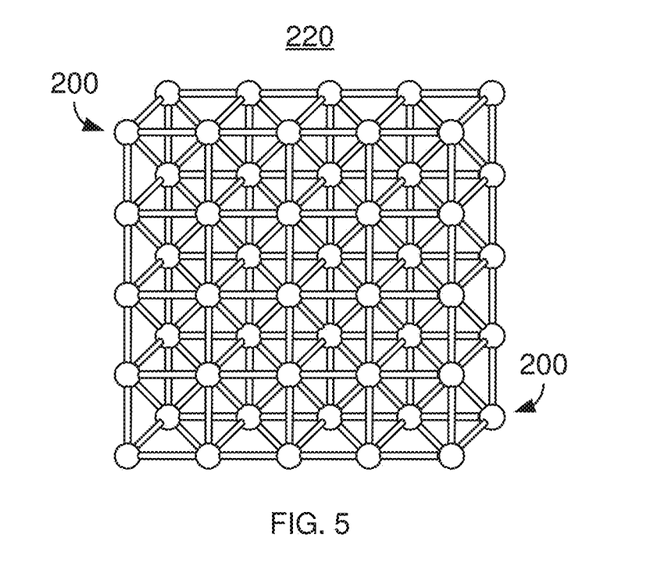

The plurality of cells 210 is extended into transverse orientations, via step 126. The transverse orientations are perpendicular to the canonical transport orientation. Thus, unit cells are repeated along transverse orientation(s) (e.g. x and y for the unit cell 200 shown in FIGS. 3-4) to form a nanowire. The direction of transmission of the nanowire is along the canonical transport orientation. The cross-sectional area of the nanowire is in the transverse orientations. As part of step 126, this repetition of the unit cells 210 is repeated to form nanowires having different cross-sectional areas. Thus, step 126 forms multiple nanowires for the canonical transport orientation. FIG. 5 depicts an exemplary embodiment of a portion of one such nanowire 220 for the unit cell 200 that is formed using step 126. In the embodiment shown, the aspect ratio for the cross-sectional area is 1:1. Thus, the nanowire 220 shown has a five unit cell by five unit cell cross-section. Multiple nanowires analogous to the nanowire 220 are formed in step 126 having a different number of unit cells in the cross-section (different cross-sectional areas). Although only two unit cells 200 are shown in the canonical transport orientation, in general the nanowire 220 has a larger number of cells along this direction. However, the total number of unit cells 200 used for a single nanowire may be relatively small. For example, in some embodiments, the total number of unit cells 200 does not exceed one hundred. Further, in other embodiments, nanowires having other aspect ratios and/or shapes may be used. For example, a cylindrical cross-section, elliptical cross-section or other cross-section may be used instead of a rectangular cross-section. The aspect ratio may also differ. For example, the aspect ratio may be 1:2, 1:3, 1:4, 3:1 and/or another value.

Figure 6:
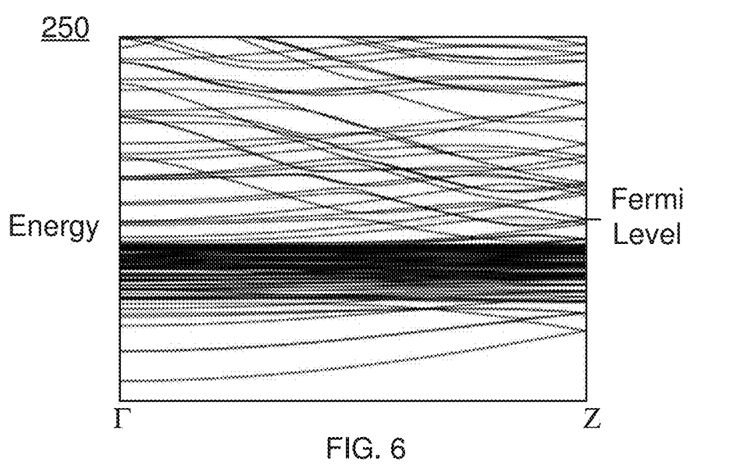
FIG. 6 depicts an exemplary embodiment of an electronic structure calculated using the method described herein.

The electronic structure, or band structure, for each of the nanowires 220 is calculated for the unit cells 200 in the nanowire, via step 128. This can be done by using any electronic structure technique that accurately represents the electronic structure/band structure of the material under consideration. Step 128 should provide the band structure for the canonical transport orientation. Stated differently, the energy versus forward transverse momentum (E vs. $k_z$ where $k_z$ is positive) is calculated for each nanowire for the canonical transport orientation. For bulk calculations, a distinct band structure $E(k_z)$ relation is obtained for each transverse mode $(k_x,k_y)$. FIG. 6 depicts an exemplary embodiment of the electronic structure 250 calculated in step 128. The electronic structure 250 is for explanatory purposes only and is not intended to limit the electronic structures determinable using the method 120. Further, in some embodiments, steps 122, 124 and 126 may be considered part of step 128 because these steps are performed in order to obtain the electronic structure.

The Fermi level for the electronic structure and the canonical transport orientation is determined for each of the nanowires 220, via step 130. Thus, the Fermi level is indicated in the electronic structure 250. Known appropriate techniques including but not limited to the bisection method may be utilized to determine the Fermi level.

The number of bands crossing the Fermi level for the electronic structure 250 of each of the nanowires 220 is calculated, via step 132. Step 132 essentially involved counting the number of bands that cross the Fermi level. For a bulk calculation, this procedure is carried out for each distinct transverse mode and the total number of modes summed over all allowed transverse modes. The number of bands crossing the Fermi level is equal to the number of the forward conducting modes for the canonical transport orientation for the nanowire. This number of forward conducting modes may be stored versus the cross-sectional area of the nanowire 220 for each nanowire 220. Thus, after step 132, the number of forward conducting bands is obtained for each cross-sectional area (each nanowire) for the canonical transport orientation. If the method 120 is to be used in connection with thin films, then steps 128, 130 and 132 may be performed for each independent transverse mode (e.g. $k_x$ or $k_y$).

Figure 7A:
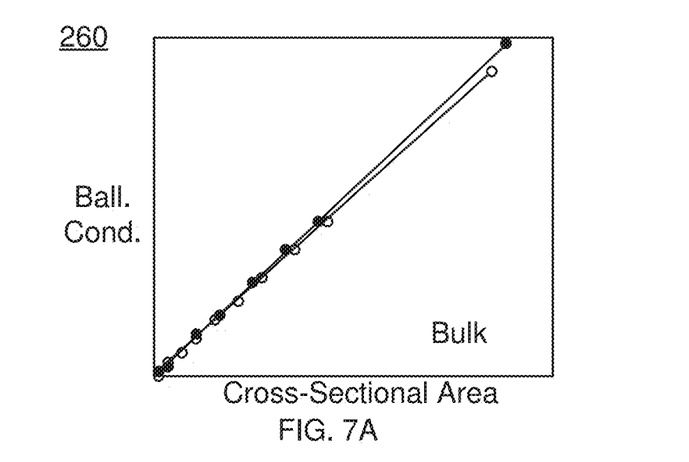
FIGS. 7A-7B are graphs depicting the number of forward conducting modes versus cross-sectional area.
Figure 7B:
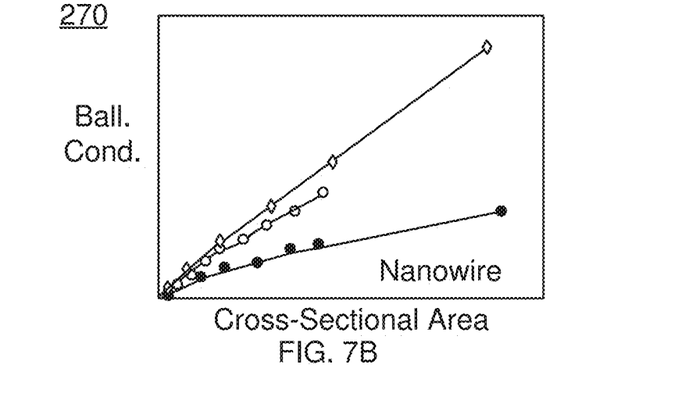

The number of forward conducting modes versus the cross-sectional area of the nanowires 220 is linearly fit, via step 134. The slope, k, of the line produced provides the number of forward conducting modes versus the cross-sectional area for the canonical transport orientation. FIGS. 7A and 7B are graphs 260 and 270 depicting the number of modes versus cross-sectional area for bulk and a nanowire, respectively, of a material. Graphs 260 and 270 are for explanatory purposes only and not intended to limit the method 120. Although the slopes are different for different canonical transport orientations in the nanowire, data for each can be fit to a line. Further, the slopes for the bulk may be different than those of the nanowire.

The FOM of the material for the canonical transport orientation is determined based on the slope, via step 136. The calculation of the FOM, $\lambda\rho$, using the slope k is relatively simple and indicated in the equation provided above. This FOM may be used for determining the suitability of the material for interconnects or other structures having the canonical transport orientation as the direction along which current is driven. For polycrystalline interconnects, however, the FOM for the material is calculated as discussed below.

The steps of selecting the canonical transport orientations for the unit cell (122), creating unit cells along the selected canonical transport orientation (124), providing unit cells along transverse orientations (126), determining the electronic structure (128), determining the Fermi level (130), determining the number of bands crossing the Fermi level (132), linearly fitting (134) and determining the FOM for canonical transport orientation of each of the remaining canonical transport orientations (136) are repeated for the remaining canonical transport orientations of the unit cell, via step 138. Although indicated as being performed in series in FIG. 2, these calculations for different canonical transport orientations may be performed in parallel. Thus, the FOMs for all of the canonical transport orientations of the unit cell (also termed herein canonical transport FOMs) may be determined.

An FOM for the material is calculated using a statistical average of the canonical transport orientation FOMs for the canonical transport orientations, via step 140. The statistical average may be determined in a variety of ways. For example, a simple mean of the canonical transport orientation FOMs for each boundary condition may be used when the FOM is not widely different for each canonical orientation. A median value of the canonical transport orientation FOMs may be used if the spread between FOMs for the canonical orientations is large. A weighted mean might also be determined in step 140. For example, a mean weighted by number of canonical transport orientations in the bulk crystal structure might be calculated in step 14. For instance, for FCC crystal structure the [100] orientation has six equivalent orientations and the [110] orientation has twelve equivalent orientations. The transport orientation weighted mean can be computed in this case as (6*[100] FOM+12*[110] FOM)/18. In another embodiment, the statistical average may be the mean weighted by expected statistical distribution of canonical transport orientations in experimental samples of nanowires, thin films or bulk metals. Other statistical averages may be used in other embodiments or situations. Thus, an FOM for the material may be calculated. The FOMs for other material(s) may be determined using the method 120. Further, the FOMs may be used to characterize the materials for various purposes including but not limited to those discussed herein.

The results may optionally be applied to machine learning, via step 142. In one embodiment, the FOM determined in step 140 may be stored, for example as reference outputs in a database. The boundary conditions (bulk/nanowire), atomic structure, and other descriptors of the material are also stored. Thus, the FOM versus boundary condition (bulk, nanowire) and structure for candidate materials may be stored as training examples in a database. The features for machine learning may be comprised of structural and electronic descriptors, such as the bispectrum or radial distribution function or the number of valence electrons for the material. Thus, a database of the calculated FOMs, the materials for the FOMs and the structural characteristics of the materials may be created.

Step 142 may also include using the database to train a machine learning algorithm that maps the inputs (structural characteristics) to outputs (FOMs) non-linearly. The machine learning algorithm can be parametric or non-parametric. Examples of machine learning algorithms that suit the purpose may include Deep Learning (for example Deep Convolutional Neural Networks), Kernel Ridge Regression, Bayesian Regression (e.g. Gaussian Process regression), Random Forests, Boosted non-linear Regression, and/or K-nearest neighbor regression. Standard practices such as test-train database splitting, cross validation, hyperparameter estimation are performed during the training process.

As part of step 142, the model trained on the database may then be used to compute FOMs for other material(s) from structural and electronic configuration information. This bypasses the need to go through steps 122 through 140 for each FOM for each new material to be characterized. This may make the method 120 extremely computationally efficient for new materials. This also allows unsupervised learning on the database to perform such functions as clustering in order to group materials with similar target FOM in order to find out what structural and electronic features are desired in a candidate replacement material. Consequently, identifying potential materials for use in various applications, including interconnects at smaller scaled nodes, may be facilitated.

The FOMs determined via step 122 through 140 or predicted in step 142 may optionally be used to determine a suitability of the material for use in the semiconductor device, via step 144. Either the FOMs for specific orientations or the FOM for the material may be used in the determination, depending upon the application. Accurate FOMs may be determined for nanowires 220 and used to determine materials for use in applications in scaled down nodes.

The FOMs may be both for nanowires and the bulk. The method 120 may directly calculate the FOM and/or predict the FOM using machine learning. The method may also be relatively simply extended to use with machine learning to improve prediction of results for additional materials.

Figure 8:
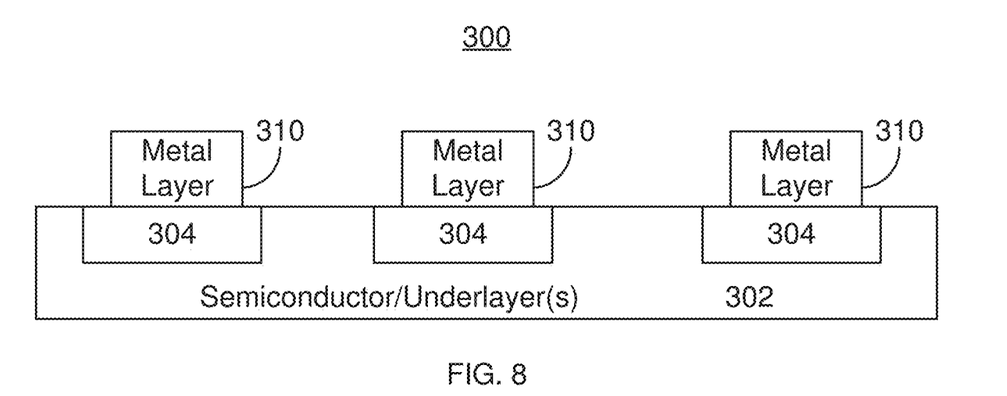
FIG. 8 depicts an exemplary embodiment of a structure in an electronic device formed using a material selected in using a FOM.

FIG. 8 depicts the semiconductor device 300 fabricated using the method 100 or 110. The semiconductor device 300 may include a substrate/various layers 302 that have already been fabricated. Also shown are devices 304 to which electrical connection is desired to be made. Metal layer 310 include material(s) selected using the method 100 and/or 110. The metal layer 310 may form interconnects at scaled down nodes. Without selection using the method 100 and/or 120, the material(s) selected for the metal layer 310 may be unsuitable, for example because of size effects. Thus, the interconnects/metal layer 310 may have the desired properties and the semiconductor device 300 function as desired.

A method and system for screening materials for use in electronic/semiconductor devices have been described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

We claim:

1. A method for characterizing a material for use in an electronic device, the material having a unit cell and a crystal structure, the method comprising:
    determining, using at least one processor, a figure of merit (FOM) for the material using only forward conducting modes for the unit cell, the FOM being a resistivity multiplied by a mean free path;
    using the FOM to determine a suitability of the material for use in the electronic device;
    wherein the determining the FOM using the processor further includes:
    selecting a plurality of canonical transport orientations for the unit cell;
    determining an electronic structure for the material using the forward conducting modes for each of a plurality of nanowires, each of the plurality of nanowires being based on the unit cell for the material and a canonical transport orientation for the unit cell corresponding to the forward conducting modes, each of the plurality of nanowires having a cross-sectional area;
    determining a Fermi level for the electronic structure and the canonical transport orientation for each of the plurality of nanowires; and
    determining a number of bands crossing the Fermi level for the electronic structure of each of the plurality of nanowires, the number of bands being the number of the forward conducting modes for the canonical transport orientation for each of the plurality of nanowires.

2. The method of claim 1 wherein the step of determining the FOM further includes:
    linearly fitting the number of forward conducting modes versus a cross-sectional area of the nanowire for the plurality of nanowires to provide a slope of the number of forward conducting modes versus the cross-sectional area; and
    determining a canonical transport orientation FOM for each of the plurality of canonical transport orientations of the material based on the slope.

3. The method of claim 2 wherein the step of determining the electronic structure for each of the plurality of nanowires further includes:
    creating a first plurality of unit cells along the canonical transport orientation;
    providing a second plurality of unit cells along at least one transverse orientation for each nanowire, the at least one transverse orientation being perpendicular to the canonical transport orientation, the second plurality of unit cells corresponding to the cross-sectional area of each of the plurality of nanowires; and
    determining the electronic structure for each of the plurality of nanowires using the first and second plurality of unit cells.

4. The method of claim 2 further comprising:
    repeating the steps of determining the electronic structure, determining the Fermi level, determining the number of bands crossing the Fermi level, linearly fitting and
    determining the canonical transport orientation FOM for each of a remaining portion of the plurality of canonical transport orientations of the material; and
    determining an FOM for the material using a statistical average of the canonical transport orientation FOM for the plurality of canonical transport orientations.

5. The method of claim 4 further comprising:
    repeating the steps of selecting the canonical transport orientations, determining the electronic structure, determining the Fermi level, determining the number of bands crossing the Fermi level, linearly fitting, determining the canonical transport orientation FOM, repeating for a remaining portion of the plurality of canonical transport orientations and determining the FOM using the statistical average of the canonical transport orientation FOMs for at least one additional material; and
    ranking the material and the at least one additional material in decreasing order of the FOM, a material having a lower FOM indicating greater conducting capacity.

6. The method of claim 4 further comprising:
    repeating the steps of selecting the canonical transport orientations, determining the electronic structure, determining the Fermi level, determining the number of bands crossing the Fermi level, linearly fitting, determining the canonical transport orientation, repeating and determining the FOM using the statistical average of the canonical transport orientation FOMs for at least one additional material; and
    storing the FOM versus and structure for the material and the at least one additional material as reference outputs, the reference outputs having inputs including electronic descriptors.

7. The method of claim 6 further comprising:
    utilizing the database to train a machine learning algorithm for non-linearly mapping the inputs to the reference outputs.

8. The method of claim 6 further comprising:
    using the machine learning algorithm to compute the FOM for a new candidate material based on the electronic descriptors of the new candidate material.

9. The method of claim 4 wherein the FOM is a bulk FOM for the material.

10. The method of claim 4 wherein the FOM is a nanowire FOM for the material.

11. The method of claim 2 wherein the cross-sectional area for each of the plurality of nanowires corresponds to an aspect ratio, the plurality of nanowires sharing the aspect ratio.

12. The method of claim 11 wherein the aspect ratio is different from 1:1.

13. The method of claim 2 wherein the cross-sectional area is selected from a circular cross-sectional area, an elliptical cross-sectional area and a rectangular cross-sectional area.

14. A method for determining a figure of merit (FOM) for a material for use in a semiconductor device, the material having a unit cell and a crystal structure, the method comprising:

selecting the canonical transport orientation for the unit cell;

creating a first plurality of unit cells along the canonical transport orientation;

providing a second plurality of unit cells along at least one transverse orientation for each of a plurality of nanowires, the at least one transverse orientation being perpendicular to the canonical transport orientation, the second plurality of unit cells corresponding to the cross-sectional area of each of the plurality of nanowires, each of the plurality of nanowires having the cross-sectional area different from the cross-sectional area of another of the plurality of nanowires; and determining the electronic structure for each of the plurality of nanowires using the first and second plurality of unit cells;

determining a Fermi level for the electronic structure and the canonical transport orientation for each of the plurality of nanowires;

determining a number of bands crossing the Fermi level for the electronic structure of each of the plurality of nanowires, the number of bands being the number of the forward conducting modes for the canonical transport orientation for the nanowire;

linearly fitting the number of forward conducting modes versus a cross-sectional area of the nanowire for the plurality of nanowires to provide a slope of the number of forward conducting modes versus the cross-sectional area;

determining a canonical transport orientation FOM for the material based on the slope, the canonical transport orientation FOM being a resistivity multiplied by a mean free path for the canonical transport orientation;

repeating the steps of selecting the canonical transport orientation, providing the first plurality of unit cells, providing the second plurality of unit cells, determining the electronic structure, determining the Fermi level, determining the number of bands crossing the Fermi level, linearly fitting and determining the canonical transport orientation FOM for each of a plurality of remaining canonical transport orientations of the material;

determining the FOM for the material using the canonical transport orientation FOM for the canonical transport orientation and the plurality of remaining canonical transport orientations;

wherein at least one of the selecting the canonical transport orientation, providing the first plurality of unit cells, providing the second plurality of unit cells, determining the electronic structure, determining the Fermi level, determining the number of bands crossing the Fermi level, linearly fitting, determining the canonical transport orientation FOM, and determining the FOM for the material using the canonical transport orientation FOM is performed using at least one processor.

* * * * *